_United States Patent Office_

3,384,655
Patented May 21, 1968

3,384,655
PREPARATION OF URETHANES
John E. Anderson, Clyde E. Parish, and George H. Ross, Houston, Tex., assignors to Signal Oil and Gas Company, Los Angeles, Calif.
No Drawing. Filed May 12, 1964, Ser. No. 366,892
13 Claims. (Cl. 260—482)

The present invention generally relates to organic compounds and methods of making the same and more particularly relates to new substituted urethane-forming adducts, substituted urethanes and methods of making the same.

Substituted urethanes are important intermediates in the preparation of various chemical products useful in agricultural chemistry, such as fungicides, insecticides, germicides and the like, and in the preparation of other types of chemical products. Moreover, selected substituted urethanes are solvents for various organic materials. Substituted urethanes in the past have usually been prepared by reactions involving the reaction of phosgene with suitable amines and alcohols. However, phosgene which has the formula $COCl_2$ is extremely poisonous and, moreover, is colorless and extremely volatile. It has been used in wartime as a lethal military gas and, accordingly, is recognized as being hazardous to employ in chemical reactions. Moreover, it is relatively expensive. In this regard it is usually manufactured by passing a mixture of carbon monoxide and chlorine, a relatively expensive reagent, over activated carbon.

Accordingly, the principal object of the present invention is to provide substituted urethanes in an improved manner.

It is a further object of the present invention to provide substituted urethane-forming adducts in high yield and at reduced cost.

The foregoing and other objects are accomplished in accordance with the present invention by providing an improved method of preparing substituted urethane-forming adducts and substituted urethanes from such adducts wherein carbonyl sulfide is utilized as a reagent. Carbonyl sulfide is a gas with a boiling point of $-36.7°$ C. at atmospheric pressure and is somewhat toxic but is considerably less so than phosgene. Moreover, carbonyl sulfide is usually present as a sulfur-bearing contaminant in various types of refinery gases, such as propylene, ethylene and the like and can be removed intact therefrom by various methods, for example, as set forth and more particularly described in copending United States patent application, Ser. No. 329,947, filed Dec. 12, 1963, now U.S. Patent No. 3,282,831 entitled Hydrocarbon Purification, of which George E. Hamm is the inventor, said application having been assigned to the assignee of the present invention. Moreover, carbonyl sulfide has the advantage of being relatively inexpensive since it can be synthesized from readily available refinery materials, such as hot sulfur and carbon monoxide, both of which are by-products of certain conventional oil refining processes.

The present invention involves the reaction of carbonyl sulfide gas with a selected secondary or tertiary amine in a suitably reactive alcoholic solvent or dispersant to form an adduct which contains the amine, the alcohol and the carbonyl sulfide. Such an adduct is then readily converted to the desired substituted urethane by a novel low temperature oxidation reaction in accordance with the present invention, during which reaction free sulfur is precipitated therefrom and water is formed as a by-product.

As a specific example, 90 gm. of diethyl amine are dissolved in 300 ml. of absolute ethyl alcohol at room temperature and the resulting solution is contacted over a 15 minute period with carbonyl sulfide gas, the gas being bubbled therethrough until approximately 60 gm. of the carbonyl sulfide gas has been absorbed by the solution. The desired adduct can be obtained in a yield of usually about 80% or more of theoretical. It is readily formed by reaction of the diethyl amine, ethanol and carbonyl sulfide in solution and consists of these three components. Such adduct is then oxidized while in the solution at $30°$ C. and an oxygen pressure of 50 p.s.i.g. in a stirred autoclave for 4 hours to a yield of about 65% of theoretical of ethyl diethyl urethane having the structural formula

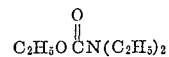

This substituted urethane is recovered from the ethanol solution by vacuum filtering off the free precipitated sulfur and then fractionally distilling the solution under vacuum.

Further objects and advantages of the present invention will be apparent from a study of the following detailed description.

Now referring more particularly to the present method, a selected secondary or tertiary amine is dissolved or dispersed in an alcohol which reacts with the amine and with carbonyl sulfide to yield the desired amine-alcohol-carbonyl sulfide adduct. The amine is preferably a secondary amine and may include, for example, the following: diethyl amine, methyl ethyl amine, dimethyl amine, dipropyl amine, methyl propyl amine, ethyl propyl amine, ethyl cyclohexyl amine, di-isopropyl amine, methyl cyclohexyl amine and propyl cyclohexyl amine. Other secondary amines also can be used, for example the following: piperidine, pyrrolidine, azetidine, ethylene imine, and various dialkyl amines. The dialkyl amines preferably have alkyl groups, the longest of which is usually not more than about 20 carbon atoms in length. Moreover, the dialkyl amines usually have total carbon contents of not more than about 24 carbon atoms.

Thus, the secondary amines may have alkyl, cycloalkyl or benzyl radicals or combinations thereof, and selection of the secondary amines is made on the basis of their reactivity with carbonyl sulfide and a reactive alcohol to form the desired adduct and the oxidizability of the adduct to the desired end product.

It has been found that as the molecular weight of the secondary amine increases, steric effects or other reaction-blocking effects tend to increase so that it becomes increasingly difficult to form the desired adduct once the molecular weight of the amine or the particular three dimensional configuration of the amine reaches a certain level. For most purposes, it is preferred to use dialkyl amines as secondary amines, although other secondary amines can be used. The usual carbon content of the dialkyl has been previously specified.

Where cycloalkyl-type amines are used, each ring may have alkyl substituents thereon, if desired, but the substituents usually have not more than about 3 carbon atoms each, and the total carbon number for all such substituents generally does not exceed about 6.

It will be understood, however, that the foregoing is a general guide, and that any sterically unhindered secondary amine which reacts with a reactive alcohol and carbonyl sulfide to form the desired carbonyl sulfide-secondary amine-reactive alcohol adduct is suitable. Thus, selection of suitable secondary amines can be readily made by those skilled in the art. For example, in addition to the previously indicated amines, certain multiple saturated and unsaturated ring compounds comprising secondary amines can be used effectively in the present method.

The present method also includes the initial use of tertiary amines as adduct-forming amines, provided that such tertiary amines are capable of being replaced by secondary amines during oxidation of the adduct. As with secondary amines, the tertiary amines preferably do not have more than about 24 carbon atoms and are otherwise subject to the general limitations of radical lengths described for the secondary amines. As with the secondary amines, the radicals of the tertiary amines can be alkyl, cycloalkyl, benzyl or combinations thereof or in some instances multiple ring radicals.

Generally speaking, however, the relatively low molecular weight trialkyl tertiary amines are most suitable for the present purposes, for example, tri-propyl amine, tri-ethyl amine and tri-ethylene diamine. The effects of molecular weight and steric blocking are taken into consideration, as previously described with reference to the secondary amines. Accordingly, tertiary amines generally are selected for use in the present method on the basis of their reactivity with the selected alcohol and carbonyl sulfide and the ability of the tertiary amine in the resulting adduct to be readily displaced or substituted for by secondary amines. Additional examples of suitable tertiary amines for the purposes of the present method include the following: trimethylamine, dimethylethylamine, dimethylpropylamine, and dimethylbenzylamine.

No practical advantage is obtained by initially using tertiary amine to form an amine-alcohol-carbonyl sulfide adduct by the present method, since a secondary amine must be substituted for the tertiary amine during oxidation of the adduct in order to obtain the desired urethane product. Instead, it is usually more convenient to initially form the desired adduct from secondary amine, and altogether obviate the use of tertiary amine in the particular procedure.

The alcohol used in the present method is any suitable aliphatic or cycloaliphatic alcohol having the general formula ROH, capable of forming an adduct with the selected secondary or tertiary amine and carbonyl sulfide, and capable of dissolving the amine and resulting adduct or at least dispersing the same. Such alcohol contributes a suitable radical to the desired substituted urethane end product. Usually, the alcohol is of relatively low molecular weight, with a total carbon atom content of usually not more than about 8 to 12 carbon atoms. However, longer chain alcohols can be used in selected circumstances, depending upon the particular secondary or tertiary amine employed. Ordinarily, cyclo-aliphatic alcohols without alyl subkstituents or with alkyl substituents of not more than about two in number, each of which contains not more than about 3 carbon atoms can be used effectively in the present method. Suitable non-limiting examples of representative alcohols which can be effectively used in the present method are the following: ethanol, methanol, n-propanol, cyclohexanol, n-butanol, isobutanol and t-butanol.

Carbonyl sulfide is *normally* employed in the adduct-forming step of the present method as a gas in as pure a form as possible and preferably in a condition essentially free of water. However, it will be understood that liquified COS (under pressure) could be used. The tertiary or secondary amine and the alcohol are also preferably employed in essentially water-free condition in the adduct-forming step. The carbonyl sulfide can contact the amine and alcohol in any suitable manner, as merely by bubbling carbonyl sulfide gas through a solution or dispersion of the amine and the alcohol until the desired concentration of carbonyl sulfide is absorbed into the alcoholic solution or dispersion and reacts with the amine and alcohol to form the desired adduct. Other suitable ways of contacting the amine and alcohol with the carbonyl sulfide can also be employed, for example, by violent agitation of the amine and alcohol under a carbonyl sulfide gas blanket or by autoclaving the amine and alcohol under a carbonyl sulfide gas blanket at super-atmospheric pressure in a stirred autoclave, or by adding liquified COS at super-atmospheric pressure to the amine-alcohol solution in such autoclave.

The desired adduct-forming reaction can be characterized generally as follows:

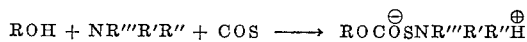

where R''' is hydrogen or a suitable radical and R, R' and R" are suitable radicals, all in accordance with the foregoing description. The adduct-forming reaction can take place at a relatively low temperature, usually from about 0° C. to about 30° C. It is important to keep the reaction temperature relatively low, as indicated, so that the adduct which is formed during the reaction will not substantially decompose and lower the yield of desired product. Temperatures as high as about 50° C. can be used.

In the case of the secondary amines, the adduct-forming reaction is characterized as follows:

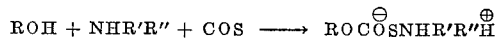

where R, R' and R" are suitable radicals in accordance with the foregoing.

In the case of tertiary amines, the adduct-forming reaction is characterized as follows:

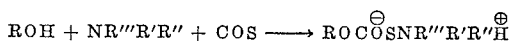

where R, R', R" and R''' are the suitable radicals in accordance with the foregoing.

Thus, such radicals conform to those described in connection with the suitable secondary and tertiary amines and alcohols.

In accordance with the present invention, the thus-form adduct, while in solution or in dispersion in the alcohol, is then oxidized to the desired substituted urethane, with concomitant precipitation of free sulfur and formation of water as a by-product. However, as more particularly set forth hereinafter, when the adduct contains tertiary amine, the oxidation must be carried out with secondary amine present in the adduct-containing solution or dispersion and in an amount sufficient to completely replace the tertiary amine of the adduct. Moreover, it is preferred to have a yield promoter present in the solution or dispersion during oxidation. Such promoter improves the yield of desired substituted urethane product and may comprise a selected water adsorber and/or a selected oxidizing agent. Thus, the oxidation reaction can be carried out under essentially anhydrous conditions and the water adsorber can be used to remove formed water and thus maintain such essentially anhydrous conditions.

The water adsorber is insoluble in the adduct-containing solution or dispersion and essentially is non-reactive under the oxidizing conditions of the present method with the adduct, the solvent or dispersant and amine, as well as carbonyl sulfide and sulfur. For such purposes, selected anhydrous inorganic salts can be used, such as anhydrous calcium sulfate, anhydrous sodium sulfate and anhydrous zinc sulfate. Alternatively, other water adsorbers can be used, such as finely divided molecular sieve material (synthetic and natural zeolites), various clays, such as attapulgite clay, selected bentonites and the like known water adsorbers. For maximum effectiveness, such water adsorbers should be used in concentrations sufficient to adsorb substantially all of the water produced during oxidation of the adduct. Accordingly, for example, 100–250 gm. of water adsorber can be employed per mol of adduct immediately before oxidation is carried out, in order to increase the yield of desired product. Other concentrations of water adsorber are also suitable.

It has been found that selected salts can be employed in the adduct-containing solution or dispersion in order to accelerate the rate of oxidation of the adduct and also to increase the yield of product. Such salts are soluble, at least to some extent, in the adduct-containing solution or dispersion. The cations thereof generally readily undergo a change in valence e.g. from a higher oxidation state to a lower oxidation state during the oxidation. For such purposes, depending on the solubility of the particular salt in the particular solvent or dispersant bearing the adduct, halides, nitrates and sulfates of such valence-changing metals, such as iron, nickel, cobalt, copper, mercury, palladium, platinum and gold can be used, as well as those salts of other metals which act in a similar manner. As specific, non-limiting examples, where the usual alcohols are used as the solvents or dispersants, ferric chloride, nickelic chloride, cobaltic chloride, copper sulfate, cobaltic sulfate, cupric nitrate, cobaltic nitrate, and the like can be effectively used depending on the particular alcohol. Usually, relatively small concentrations, for example 1–5 percent (by weight of adduct), of the selected oxidizing agents are sufficient to provide the enhanced results. The optimum concentration of the particular oxidizing agent, of course, will vary, depending on such agent, the particular adduct, the particular solvent or dispersant, etc.

In any event, the oxidation reaction is carried out under controlled conditions and in a novel manner, including a reaction temperature preferably not in excess of about 30–50° C. and generally within the range of from about 0° C. to about 100° C. If substantially higher temperatures are used, the yield of product may be materially impaired. Accordingly, it is important for the purposes of the present invention that the oxidation be accomplished within the indicated relatively low temperature range.

Such oxidation can be carried out in any suitable manner in accordance with the foregoing, for example, by contacting the adduct-containing solution or dispersion, preferably containing the water adsorber and/or oxidizing agent, with oxygen at superatmospheric pressure in a stirred autoclave or the like and at, for example, about 20° C. to 30° C. for a sufficient length of time to complete the reaction, for example from about 2 to about 24 hours, or by allowing such solution or dispersion to stand exposed to air or under an oxygen blanket for a week or more at ambient temperature. Other suitable techniques for carrying out the oxidation reaction also can be employed. It is also preferred that the oxidation reaction be carried out utilizing initially essentially anhydrous constituents, as previously described.

Once the desired substituted urethane is formed by the oxidizing reaction, such substituted urethane can be separated from the remaining constituents in the solution or dispersion, in any suitable manner. For example, vacuum filtration or the like can be employed to remove the precipitated free sulfur, and other solid constituents and then fractional crystallization or fractional distillation, preferably at low temperature, for example, as by vacuum distillation or the like can be used to separate liquid products. However, for such separation it is permissible to employ some heat above the 100° C. limit imposed for the oxidizing reaction itself, inasmuch as the final product has already been formed, and there is now less damage of reduction in yield due to adverse effects of heat.

In the case of the secondary amine-containing adduct initially formed from secondary amine, the oxidation reaction is characterized as follows:

$$RO\overset{\ominus}{C}OSNHR'R''H + \tfrac{1}{2}O_2 \longrightarrow ROCONR'R'' + H_2O + S$$

where R, R' and R'' are suitable radicals, in accordance with the foregoing. The desired end product

ROCONR'R'' is a substituted urethane obtained directly from the oxidizing reaction, along with the by-products water and free precipitated sulfur.

If excess secondary amine is present in the adduct-containing solution or dispersion during the oxidizing reaction, there is a tendency for a small concentration of a tetra-substituted urea to form, as by the following reaction:

ROCONR'R'' + NHR'R'' ⟶ R'R'''NCONR'R'' + ROH

However, the yield of the tetra-substituted urea usually is very small, below about 5% of the total product, i.e. desired substituted urethane produced. Moreover, in those instances where the adduct-containing alcoholic solution or dispersion which is oxidized contains essentially no free secondary amine at the beginning of the oxidizing reaction, the yield of tetra-substituted urea produced usually is relatively insignificant. Accordingly, it is preferred to employ about equimolar concentrations of the carbonyl sulfide and secondary amine in an excess of the alcohol to assure the substantial absence of free secondary amine after adduct formation.

In the case of the tertiary amine-containing adduct, secondary amine must be added to the adduct-containing alcoholic solution prior to or at the beginning of the oxidizing step in order to obtain the desired yield of substituted urethane. Thus, in the presence of free secondary amine in the alcoholic solution, the tertiary amine-containing adduct is largely converted to the desired substituted urethane, in a manner which is believed to be, at least in part, according to the following:

$$RO\overset{\ominus}{C}OSN\overset{\oplus}{R}'''R'R''H + NHR'R'' + \tfrac{1}{2}O_2 \longrightarrow ROCONR'R'' + NR'''R'R'' + H_2O + S$$

As can be seen from the above, the tertiary amine can be recovered essentially intact at the end of the oxidizing reaction. However, as previously indicated, there is no practical advantage in utilizing tertiary amine in the initial adduct-forming reaction, since this amine must in any event be substituted for, replaced by, or otherwise eliminated from the reaction by the secondary amine during oxidation in order to obtain the desired product. Moreover, the presence of substantial amounts of free secondary amine during such oxidation tends to promote the formation of undesired tetra-substituted urea, as by the previously-described by-product reaction. It is preferred to initially utilize the secondary amine for the adduct-forming step so as to simplify the recovery of the desired substituted urethane end product from solution or dispersion, as well as maximize the yield thereof.

The following examples further illustrate certain features of the present invention:

Example I

In a first test, dimethyl amine in 60 gm. amount is dissolved in 300 cc. of ethyl alcohol, and the resulting solution is contacted at 20° C. with carbonyl sulfide gas (the gas being bubbled therethrough) for a period of 45 minutes until about equimolar amounts of the carbonyl sulfide and the secondary amine are present in solution and until the desired dimethyl amine-carbonyl sulfide-ethanol adduct is formed in a yield of about 100 percent of theoretical.

Thereafter, the solution, now containing the about 100 percent of theoretical yield of the adduct (dimethyl amine-carbonyl sulfide-ethyl alcohol) is oxidized at 25° C. in a stirred autoclave under an oxygen blanket at 50 p.s.i.g. oxygen pressure for 3 hours, then removed from the autoclave, filtered to remove free precipitated sulfur and vacuum distilled to recover an about 50 percent of theoretical yield of the desired substituted urethane, ethyl dimethylcarbamate,

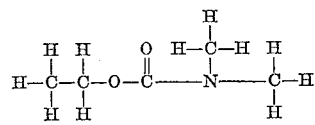

a valuable intermediate for drug synthesis. A small concentration, less than about 1 percent by weight, of the tetra-substituted urea, N,N' dimethyl urea

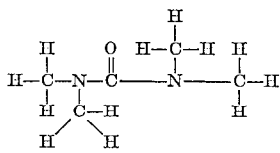

is also formed, due to the presence of small amounts of free dimethyl amine in solution and substitution of that amine radical for the ethoxy radical in the desired substituted urethane.

In a second parallel test, the described procedure is duplicated, except for the addition of 200 gm. of anhydrous calcium sulfate to the adduct-containing solution immediately before the oxidation step. The yield is increased to about 75 percent of theoretical, thus establishing the beneficial effects of a drying agent in the present oxidizing step.

In a third parallel test, 200 gm. of anhydrous sodium sulfate are substituted for the calcium sulfate, with identical results, including yield of product.

In a fourth parallel test, 300 gm. of attapulgite clay are substituted for the sodium sulfate, again with identical results.

In a fifth parallel test, 2 gm. of anhydrous cobalt chloride are substituted for the anhydrous sodium sulfate, again with a yield of ethyl dimethylcarbamate of about 75 percent of theoretical. However, the oxidation step in this instance is reduced to 30 minutes duration.

In a sixth parallel test, 3 grams of cupric nitrate are substituted for the cobalt chloride, with similar results, and in a seventh parallel test, 3 grams of mercuric bromide are substituted for the cupric nitrate, again with similar results.

In an eighth parallel test, 200 gm. of anhydrous calcium sulfate and 2 gm. of anhydrous cobalt chloride are added to the adduct-containing solution, with the same results as with the fifth parallel test, including the same yield and the same reduction in the amount of time required to complete the oxidation step.

Example II

In a first run, diethyl amine is dissolved in 73 gm. amount in 300 cc. of methyl alcohol solution at about 25° C. and the resulting solution is contacted for 1 hour with carbonyl sulfide gas. The oxidation, separation and distillation steps are carried out in the same manner as with the dimethyl amine-containing adduct of Example I and an about 65 percent of theoretical yield is obtained of methyl diethylcarbamate

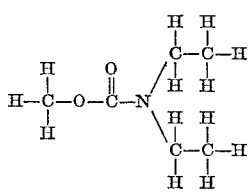

useful in the synthesis of a variety of end products in the medical and pharmaceutical and chemical fields. For example, methyl diethylcarbamate can be converted to a naphthyl diethylcarbamate by ester exchange with naphthol. The product can be used as a herbicide.

In a parallel run under the same conditions as the first run, except for the addition of 2 gm. of anhydrous $CoCl_2$ to the adduct-containing solution immediately before the oxidizing step, oxidation proceeds to completion in 30 min. and the yield is increased to 75 percent.

Example III

The general procedure of the first run of Example II is followed, except that dimethyl amine is used as the secondary amine in 45 gm. amount in 300 cc. of n-propyl alcohol at about 20° C. A concentration of 60 gm. of carbonyl sulfide, equimolar to that of the amine, is bubbled as a gas into the amine-containing alcoholic solution over a period of 1 hour and is absorbed therein, at the end of which time the desired adduct is present in essentially theoretical amount. Moreover, the oxidation step is carried out by allowing the adduct-containing solution to stand at about 20° C. exposed to air for one month. The oxidation of the adduct results in an about 50 percent of theoretical amount of propyl dimethylcarbamate,

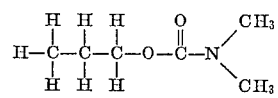

which is useful as an intermediate in a wide variety of syntheses.

Example IV

About 175 gm. of piperidine are dissolved in 300 ml. of absolute methyl alcohol. The resulting solution is contacted over a 1 hour period at about 30° C. with carbonyl sulfide gas to provide an equimolar concentration of the carbonyl sulfide (60 gm. COS) with the piperidine in the solution. The adduct-containing solution is then oxidized at 50 p.s.i.g. oxygen pressure in a stirred autoclave for about 3 hours at 20° C., then filtered free of precipitated sulfur, and fractionally distilled to recover an about 65 percent of theoretical yield of the methyl carbamate containing the piperidyl group.

Example V

About 100 gm. of N-methyl cyclohexyl amine are dissolved in 400 cc. of cyclohexanol and the solution is contacted for 2 hours at 30° C. with carbonyl sulfide gas (by bubbling the gas therethrough) until the adduct-forming reaction is complete. The solution is then oxidized, filtered and distilled as per Example IV, to provide an about 50 percent of theoretical yield of N,N'-cyclohexyl methyl cyclohexyl urethane, an intermediate in selected chemical reactions. This product has the structural formula:

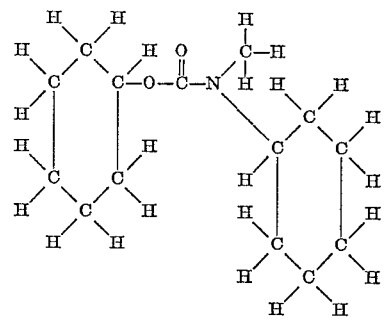

In like manner, the corresponding urethane can be prepared from pyrrolidine and ethyl alcohol; methyl dicyclohexylcarbamate can be prepared from dicyclohexylamine and methyl alcohol; and cyclohexyl N,N-methylethyl carbamate can be prepared from methylethyl amine and cyclohexanol.

In the case of the preparation of the desired substituted urethanes from tertiary amine-containing adducts, as previously described the adduct is oxidized in the presence of secondary amine. The following examples are illustrative of this type of procedure.

Example VI

About 59 gm. of trimethyl amine are dissolved in 300 ml. of absolute ethanol and contacted at 30° C. for 1 hour with gaseous carbonyl sulfide to provide 60 gm. of carbonyl sulfide in the solution. To the resulting adduct-containing solution is added dimethyl amine in 45 gm. amount. Thereafter, the solution is oxidized in a stirred autoclave at 30° C. for 4 hours under 50 p.s.i.g. oxygen pressure, then filtered free of precipitated sulfur and vacuum distilled. The substituted urethane ethyl N,N'-dimethyl urethane is obtained in an about 70 percent of theoretical yield.

In a manner similar to Example VI, methyl diethylcarbamate can be prepared from a triethyl amine-containing adduct in methyl alcohol by oxidizing in the presence of diethyl amine; a urethane containing the piperidyl structure can be prepared from a trimethyl amine-containing adduct in methyl alcohol by oxidizing in the presence of piperidine; and, cyclohexyl dicyclohexylcarbamate can be prepared from a triethyl amine-containing adduct in cyclohexanol by oxidizing the adduct in the presence of dicyclohexylamine.

The preceding examples clearly illustrate that new adducts which yield substituted urethanes can be easily prepared in high yield by the present method, utilizing a minimum number of steps and readily available reactants, including carbonyl sulfide. The adduct-forming reaction is usually carried out under essentially anhydrous conditions and at relatively low temperature. It will be understood that in the preceding examples the adduct-forming step is carried out under essentially anhydrous conditions. The oxidizing reaction proceeds relatively rapidly at relatively low temperatures to provide the desired substituted urethane end-products. Such reaction proceeds even more rapidly in the presence of small concentrations of selected oxidizing agents, as described. Moreover, the yield of desired product is increased thereby, as it is through the use of larger amounts of the described water adsorbers under substantially anhydrous conditions.

Such substituted urethanes have a wide variety of uses in the chemical industry, for example, in the synthesis of various pharmaceuticals, agricultural chemicals and the like, including isocyanates. Thus, fungicides, germicides, insecticides and the like can be prepared from the substituted urethanes, as previously more particularly described. The present method is simple, direct, utilizes a minimum number of readily available chemicals, is inherently relatively safe and results in a high yield of product. Other advantages of the present invention are as set forth in the foregoing.

Various modifications, alterations, substitutions and additions can be made in the present method, in the parameters and materials for carrying out the steps of the method, and in the novel adducts and end products of the method. All such modifications, alterations, substitutions and additions which are within the scope of the appended claims form a part of the present invention.

What is claimed is:

1. An improved method of preparing substituted urethanes, which method comprises oxidizing an adduct consisting of selected adduct-forming secondary amine, alcohol and carbonyl sulfide

wherein R' and R" are selected from the group consisting of alkyl, cycloalkyl and benzyl radicals and R is selected from the group consisting of aliphatic and cycloaliphatic radicals, in the presence of oxygen within an alcohol solvent at a reaction temperature not in excess of about 100° C. to the corresponding substituted urethane, water and precipitated free sulfur.

2. The method of claim 1 wherein said solvent comprises the same alcohol which forms a portion of said adduct.

3. An improved method of preparing substituted urethanes, which method comprises forming an adduct of a selected secondary amine, alcohol and carbonyl sulfide, having the general formula

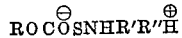

wherein R' and R" are selected from the group consisting of alkyl, cycloalkyl and benzyl radicals and R is selected from the group consisting of aliphatic and cycloaliphatic radicals, which adduct is capable of yielding a substituted urethane upon oxidation thereof at low temperature, and thereafter oxidizing said adduct in the presence of oxygen within an alcohol solvent at a reaction temperature not in excess of about 100° C. to the corresponding substituted urethane, water and precipitated free sulfur.

4. The method of claim 3 wherein said adduct is formed by first dissolving said secondary amine in said alcohol and thereafter contacting said carbonyl sulfide with said solution at a temperature not in excess of about 50° C. for a time sufficient so that a substantial concentration of said adduct is formed.

5. The method of claim 3 wherein said adduct is formed by first contacting a tertiary amine dissolved in said alcohol with said carbonyl sulfide at a temperature not in excess of about 50° C. and thereafter contacting the resulting adduct consisting of tertiary amine-alcohol-carbonyl sulfide having the general formula

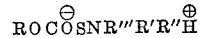

wherein R', R" and R''' are selected from the group consisting of alkyl, cycloalkyl and benzyl radicals and R is selected from the group consisting of aliphatic and cycloaliphatic radicals with a secondary amine capable of substituting for said tertiary amine, and substituting said secondary amine for said tertiary amine before said oxidizing is carried to completion.

6. The method of claim 3 wherein a selected water adsorber insoluble in said alcohol is present with said adduct-containing solution during said oxidizing in a concentration sufficient to maintain substantially anhydrous conditions during said oxidizing.

7. The method of claim 6 wherein said water adsorber comprises anhydrous sodium carbonate.

8. The method of claim 6 wherein said water adsorber comprises anhydrous calcium sulfate.

9. The method of claim 3 wherein a selected oxidizing agent comprising inorganic metal salt at least partially soluble in said alcohol and capable of readily changing its oxidation state during said oxidizing, is present in said adduct-containing solution during said oxidizing in a concentration sufficient to improve the yield of substituted urethane product.

10. The method of claim 9 wherein said oxidizing agent comprises anhydrous cobalt chloride, $CoCl_2$.

11. The method of claim 4 wherein said secondary amine is dimethyl amine, wherein said alcohol is ethyl alcohol and wherein said substituted urethane is ethyl dimethyl carbamate.

12. The method of claim 5 wherein said tertiary amine is trimethyl amine, wherein said alcohol is ethyl alcohol, wherein said secondary amine is dimethyl amine and wherein said substituted urethane is ethyl dimethyl carbamate.

13. The method of claim 1 wherein the oxidation is carried out in the presence of a promoter selected from the group consisting of an anhydrous alcohol insoluble water absorber, an inorganic metal salt at least partially soluble in said alcohol and capable of readily changing its oxidation state during said oxidizing and mixtures thereof.

No references cited.

LORRAINE A. WEINBERGER, *Primary Examiner.*

R. K. JACKSON, *Examiner.*

A. P. HALLUIN, *Assistant Examiner.*